United States Patent
Santelia et al.

(10) Patent No.: US 11,120,107 B2
(45) Date of Patent: Sep. 14, 2021

(54) MANAGING CONTENT DELIVERY TO CLIENT DEVICES

(71) Applicant: INTERNATIONAL BUSINESS MACHINES CORPORATION, Armonk, NY (US)

(72) Inventors: Michael Joseph Santelia, Raleigh, NC (US); Mauro Marzorati, Lutz, FL (US); Seda Özses, Vienna (AT); Juraj Nyíri, Ivanka pri Nitre (SK)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 330 days.

(21) Appl. No.: 16/212,016

(22) Filed: Dec. 6, 2018

(65) Prior Publication Data

US 2020/0184035 A1    Jun. 11, 2020

(51) Int. Cl.
*G06F 21/10* (2013.01)
*H04L 29/08* (2006.01)
(Continued)

(52) U.S. Cl.
CPC .............. *G06F 21/10* (2013.01); *G06F 21/44* (2013.01); *H04L 63/10* (2013.01); *H04L 63/126* (2013.01); *H04L 63/1441* (2013.01); *H04L 67/02* (2013.01); *H04L 67/28* (2013.01); *G06F 2221/2119* (2013.01); *H04L 2463/101* (2013.01)

(58) Field of Classification Search
CPC ........................................................ G06F 21/10
See application file for complete search history.

(56) References Cited

U.S. PATENT DOCUMENTS 5,784,565 A    7/1998    Lewine
6,118,449 A    9/2000    Rosen et al.
(Continued)

FOREIGN PATENT DOCUMENTS

WO    200054128    9/2000

OTHER PUBLICATIONS

"GDPR FAQs—EUGDPR," [online] EU General Data Protection Regulation (GDPR) [retrieved Aug. 27, 2018], retrieved from the Internet: <https://eugdpr.org/the-regulation/gdpr-faqs/>, 3 pg.
(Continued)

*Primary Examiner* — Simon P Kanaan
(74) *Attorney, Agent, or Firm* — Garg Law Firm, PLLC; Rakesh Garg; Anthony Curro

(57) ABSTRACT

Managing content delivery and content usage for client devices can include receiving, using computer hardware, HyperText Markup Language (HTML) code from a content server, wherein the HTML code is sent in response to a request originating from a client device, sending to an HTML licensing server, using the computer hardware, a query specifying the content server and a list including an HTML construct detected in the HTML code, receiving from the HTML licensing server, using the computer hardware, HTML license information specifying a validity status for the HTML construct on the list and a period of time for which the validity status is active, and determining, using the computer hardware, that the HTML code is invalid based on a current time, the validity status of the HTML construct, and the period of time.

20 Claims, 6 Drawing Sheets

(51) Int. Cl.
  *G06F 21/44*   (2013.01)
  *H04L 29/06*   (2006.01)

(56) References Cited

U.S. PATENT DOCUMENTS

| | | | |
|---|---|---|---|
| 6,338,096 | B1 | 1/2002 | Ukelson |
| 7,032,110 | B1 | 4/2006 | Su et al. |
| 7,665,147 | B2 * | 2/2010 | Sullivan .................. H04L 29/06 726/29 |
| 7,796,603 | B1 * | 9/2010 | Bertone ................ H04L 65/105 370/395.2 |
| 8,499,339 | B2 | 7/2013 | Chao et al. |
| 9,917,908 | B1 | 3/2018 | Knecht |
| 2002/0107809 | A1 | 8/2002 | Biddle et al. |
| 2003/0177396 | A1 * | 9/2003 | Bartlett ................. H04L 47/283 726/15 |
| 2011/0154187 | A1 | 6/2011 | Sadowski et al. |
| 2013/0198313 | A1 | 8/2013 | Hayton et al. |
| 2015/0207870 | A1 | 7/2015 | Kanakapura et al. |
| 2015/0302181 | A1 * | 10/2015 | Fahn ........................ G06F 16/40 726/26 |
| 2016/0103565 | A1 * | 4/2016 | Greenberg .......... G06F 3/04883 715/833 |
| 2017/0017634 | A1 * | 1/2017 | Levine .................... G06T 11/60 |
| 2018/0373847 | A1 * | 12/2018 | Lo ......................... H04L 63/062 |
| 2019/0306145 | A1 * | 10/2019 | Santelia ............. H04L 67/2823 |

OTHER PUBLICATIONS

List of all IBM related dockets, Appendix P, 2020.

* cited by examiner

700

Receive HTML code from a content server, wherein the HTML code is sent in response to a request originating from a client device
702

Send, to an HTML licensing server, a query specifying the content server and a list including an HTML construct detected in the HTML code
704

Receive, from the HTML licensing server, HTML license information specifying a validity status for the HTML construct on the list and a period of time for which the validity status is active
706

Determine that the HTML code is not licensed based on a current time, the validity status of the HTML construct, and the period of time
708

Notify client device that HTML code is invalid
710

Modify HTML code and provide to client device
712

FIG. 7

MANAGING CONTENT DELIVERY TO CLIENT DEVICES

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This disclosure relates to managing content delivery to client devices and, more particularly, to validating HyperText Markup Language (HTML) code intended for a client device.

Client devices routinely request content from servers via network connections over the Internet. The content is typically delivered from the server to the client device as HTML code, though other types of content may also be delivered (e.g., multimedia, JavaScript, Cascading Style Sheets (CSS), and the like). For example, the content is typically embedded within HTML tags of the HTML document provided to the client device. Upon receiving the HTML document, a browser or other application executing in the client device is capable of interpreting the HTML document, e.g., the tags and/or instructions, to render the content for display and/or presentation to a user.

Because the HTML document is open to inspection and manipulation by entities that may intervene between the client device and the server, the HTML document that is provided to the client device may be compromised in some way. For example, the HTML code in the HTML document may be modified by an intervening entity in a way that makes the behavior of the HTML code, when executed, harmful to the client device and/or other devices.

SUMMARY

In one or more embodiments, a method includes receiving, using computer hardware, HyperText Markup Language (HTML) code from a content server, wherein the HTML code is sent in response to a request originating from a client device, and sending, to an HTML licensing server, using the computer hardware, a query specifying the content server and a list including an HTML construct detected in the HTML code. The method includes receiving, from the HTML licensing server, using the computer hardware, HTML license information specifying a validity status for the HTML construct on the list and a period of time for which the validity status is active. The method also includes determining, using the computer hardware, that the HTML code is invalid based on a current time, the validity status of the HTML construct, and the period of time.

In one or more embodiments, a system includes a processor configured to initiate executable operations. The executable operations include receiving HTML code from a content server, wherein the HTML code is sent in response to a request originating from a client device, and sending, to an HTML licensing server, a query specifying the content server and a list including an HTML construct detected in the HTML code. The executable operations include receiving, from the HTML licensing server, HTML license information specifying a validity status for the HTML construct on the list and a period of time for which the validity status is active. The executable operations also include determining that the HTML code is invalid based on a current time, the validity status of the HTML construct, and the period of time.

In one or more embodiments, a computer program product includes a computer readable storage medium having program code stored thereon. The program code is executable by a processor to initiate executable operations. The executable operations include receiving HTML code from a content server, wherein the HTML code is sent in response to a request originating from a client device, and sending, to an HTML licensing server, a query specifying the content server and a list including an HTML construct detected in the HTML code. The executable operations include receiving, from the HTML licensing server, HTML license information specifying a validity status for the HTML construct on the list and a period of time for which the validity status is active. The executable operations also include determining that the HTML code is invalid based on a current time, the validity status of the HTML construct, and the period of time.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 7 illustrates a method of validating HTML code for a client device according to another embodiment of the present invention.

DETAILED DESCRIPTION

Figure 1:
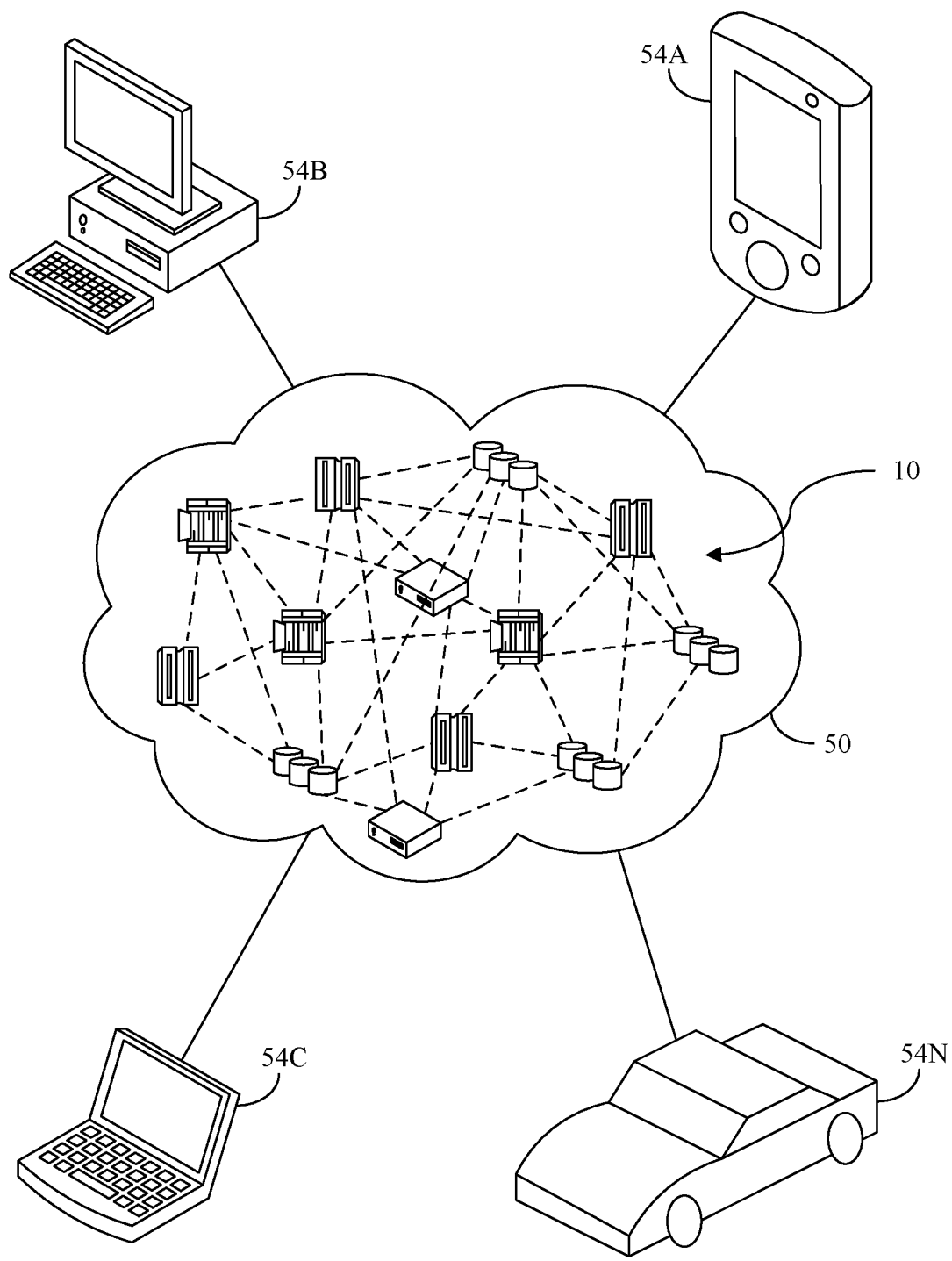
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to managing content delivery to client devices and, more particularly, to validating Hyper-Text Markup Language (HTML) code intended for a client device. In accordance with the inventive arrangements described within this disclosure, a system is capable of analyzing HTML code that is intended for a client device. The system is capable of determining whether selected HTML constructs found in the HTML code are valid based on HTML licensing information obtained from an HTML licensing server. The system is capable of notifying the client device as to the validity of the HTML code. In particular aspects, the system is capable of modifying the HTML code based on the validity of the selected HTML constructs. The system may provide the HTML code, as modified, to the client device.

In one or more embodiments, the system is implemented as a proxy server. The system, being implemented as a proxy server, is capable of acting as an intermediary between the client device and a content server from which the HTML code is obtained. In such embodiments, the system is capable of intercepting the HTML code, notifying the client device of the validity of the HTML code, and/or modifying the HTML code prior to delivery to the client device. In one or more other embodiments, the system is implemented in the client device, e.g., as software executing in the client device. In that case, the system is capable of intercepting the HTML code, notifying the client device of the validity of the HTML code, and/or modifying the HTML code prior to the HTML code being rendered by the client device to a user.

The inventive arrangements described within this disclosure may be used in a variety of different contexts to address a variety of different technical issues. In one example, the system may be used to improve security. The system may be configured to check HTML code for malicious code that may have been introduced to induce harm to the client device or to other devices coupled to the client device. As an illustrative and nonlimiting example, the system may be configured to check the head section of HTML code for HTML constructs, e.g., tags or instructions, that download additional code such as JavaScript and/or CSS files to the client device. The system is capable of preventing the downloading of a malicious JavaScript file, for example, by checking the validity of the HTML construct(s) responsible for downloading such additional code with the HTML licensing server. The system is capable of removing HTML constructs deemed invalid as determined from HTML licensing information obtained from the HTML licensing server.

In another example, the system may be used to assist with compliance issues. As an illustrative and nonlimiting example, entities doing business with the European Union (EU) and/or EU citizens are to comply with the EU's General Data Protection Regulation (GDPR). The system may be used to prevent the sharing of data that is subject to protection under the GDPR. For example, many corporations maintain a large number of Web pages. These Web pages often contain personal information for employees, customer support agents, consultants, and other affiliated individuals or groups. The personal information may be in the form of a name, an electronic mail address, or an image, for example. In cases where a request is made to remove such personal information from web pages of an entity, it may be technically difficult to remove the personal information from each of the many Web pages maintained by the entity. The number of Web pages maintained by the entity, for example, may be so large that removing particular data items from each such Web page individually is difficult and enormously time consuming. An example scenario where personal information should be removed from the entity's many web pages is where a contract between the entity and an individual ends. In such cases, the system is capable of ensuring that such personal information is removed from the HTML code of the web pages prior to delivery to a client device and/or rendering by the client device by checking the validity of the HTML constructs that specify such content with the HTML licensing server.

In yet another example, the system may be used to improve the operation of a computer system and/or computing environment. The system is capable of checking for particular HTML constructs within HTML code that are duplicative or that consume more than a minimum amount of bandwidth to send over a network. Such HTML constructs may be designated by the HTML licensing server as invalid, for example. The system is capable of removing such HTML constructs from the HTML code. By removing such HTML constructs, the HTML code being sent to the client device and/or rendered by the client device is smaller and more efficient, thereby requiring less bandwidth to transmit and/or fewer computational resources to render. As such, the HTML code may be transmitted to the client device in less time and/or rendered more quickly by the client device than would otherwise be the case.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
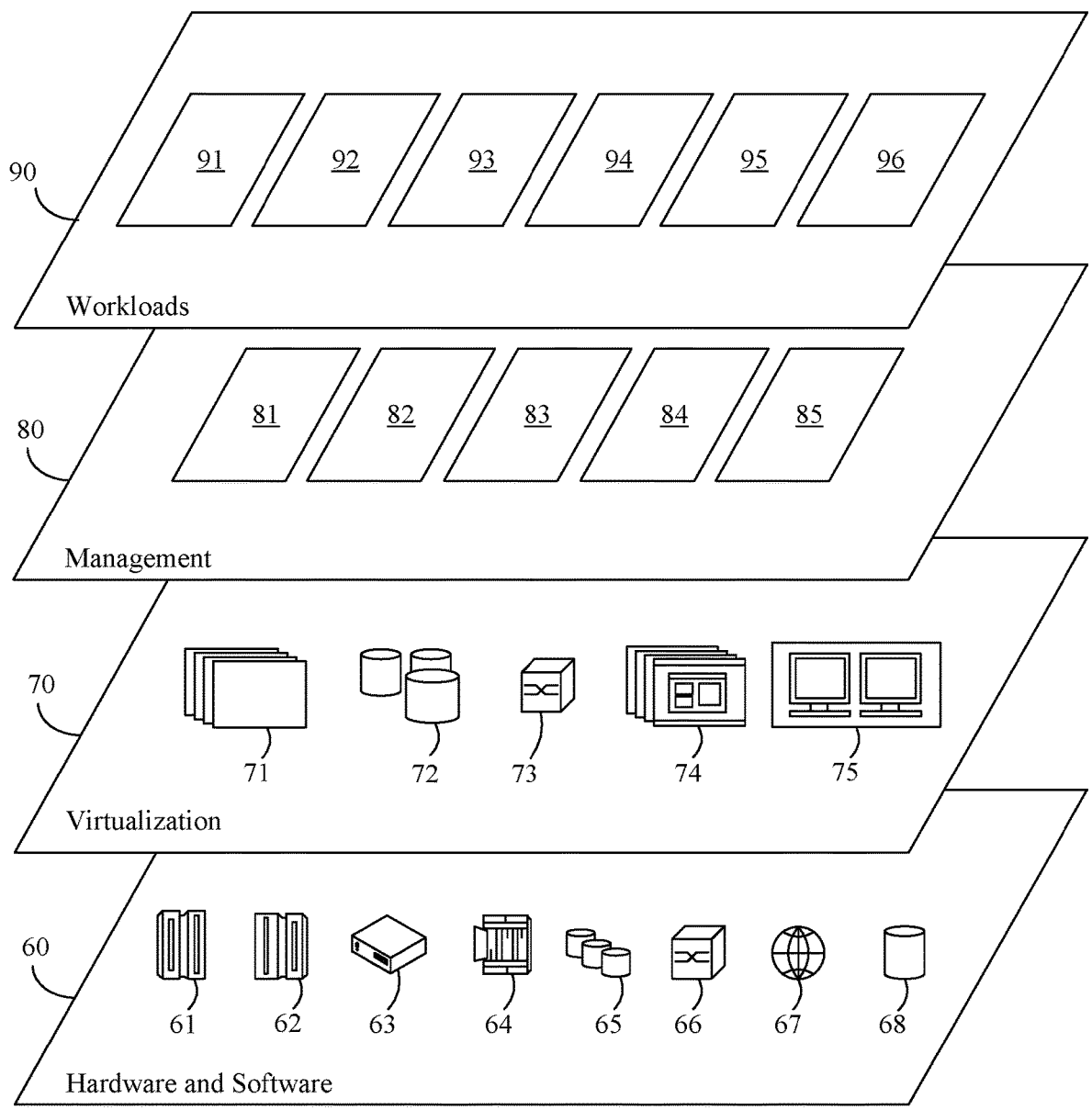
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a validation system (system) 96.

In the example of FIG. 2, system 96 may be implemented as or operate as a proxy server. System 96 is capable of receiving HTML code from a content server in response to a client device submitting a request. In particular cases, to be described herein in greater detail, system 96 sends, to an HTML licensing server, a query specifying the content server and a list including one or more HTML constructs detected in the HTML code from the content server and intended to be provided to the client device. System 96 may receive, from the HTML licensing server, a response specifying HTML license information. The HTML license information may specify a validity status for each of the HTML constructs on the list and a period of time for which the validity status is active. In one or more embodiments, system 96 is capable of notifying the client device that the HTML code is invalid based on the HTML license information. In one or more other embodiments, system 96 is capable of modifying the HTML code based on the received HTML license information. For example, system 96 is capable of removing, from the HTML code, each HTML construct having an invalid validity status for a current time that is within the period of time for which the validity status is active.

Figure 3:
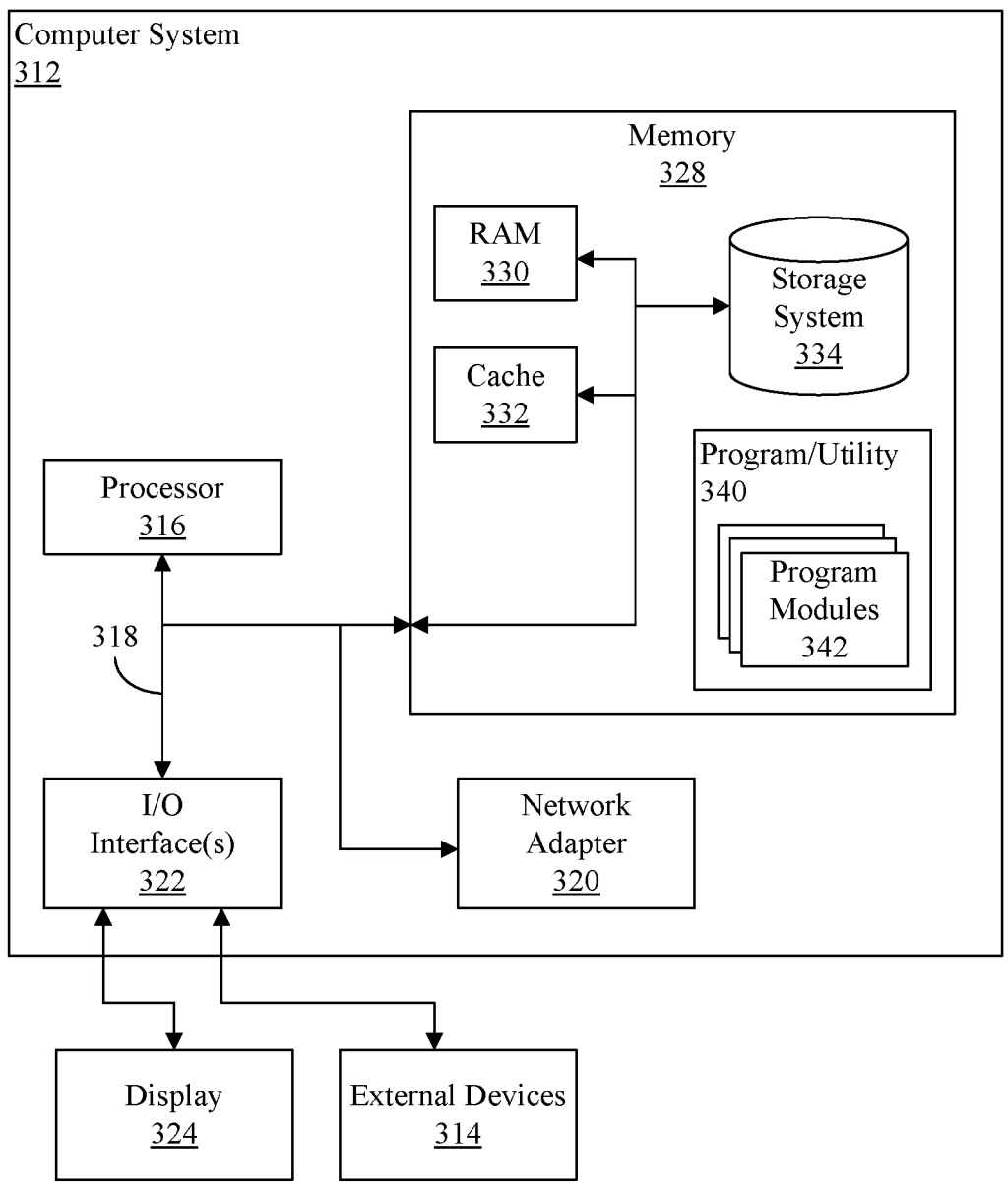
FIG. 3 depicts a cloud computing node according to an embodiment of the present invention.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general purpose or special purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via Input/Output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate executable operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 4:
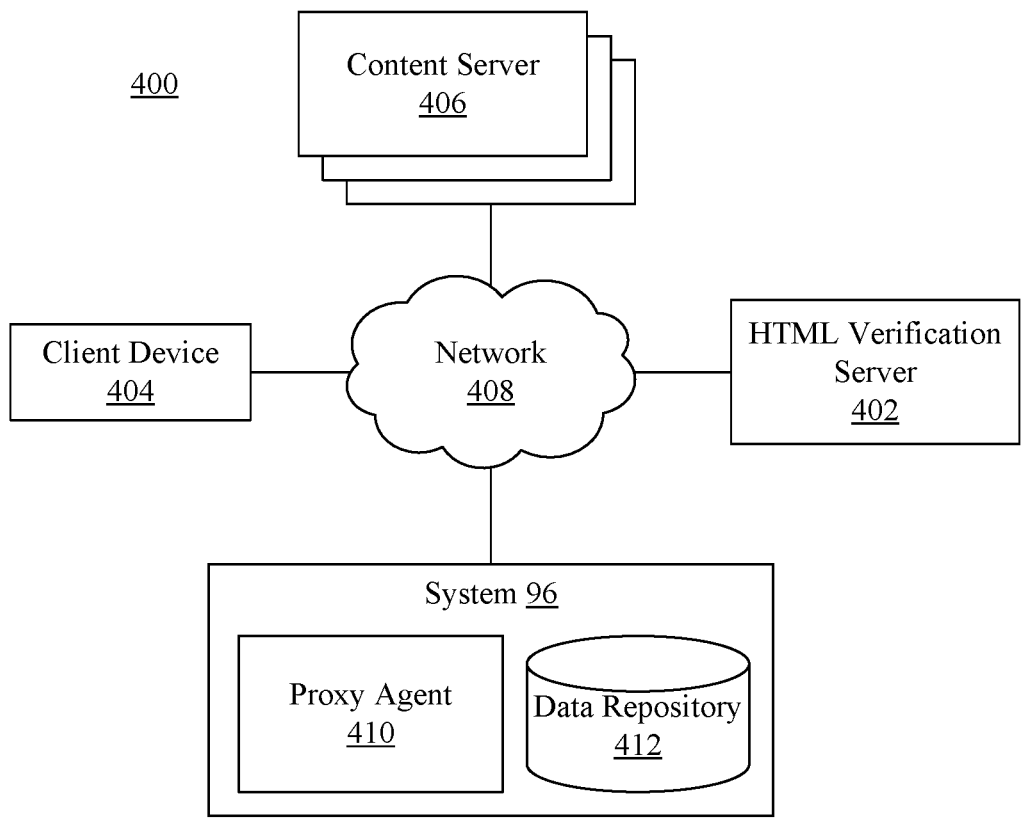
FIG. 4 depicts a computing environment including a system for validating HyperText Markup Language (HTML) code for a client device according to an embodiment of the present invention.

FIG. 4 depicts a computing environment 400 including a system 96 for validating HTML code for a client device according to an embodiment of the present invention. In the example of FIG. 4, computing environment 400 includes system 96, an HTML licensing server 402, a client device 404, and one or more content servers 406. System 96, HTML licensing server 402, client device 404, and content servers 406 are coupled to network 408. It should be appreciated that computing environment 400 is illustrated with one client device for purposes of illustration. Computing environment 400 and system 96 may be operable with more than one client device.

Network 408 is the medium used to provide communication links between various devices and data processing systems connected together within computing environment 400. Network 408 may include connections, such as wired communication links, wireless communication links, or fiber optic cables. Network 408 may be implemented as, or include, one or more or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

In the example of FIG. 4, client device 404 may be implemented as any of the client devices described herein or as other comparable or suitable client devices. Client 404, for example, may execute a browser or other applications (e.g., software) capable of requesting content or resources from a server such as content server 406. For example, client device 404 is capable of requesting content such as an HTML document (e.g., HTML code) from content server 406. Content server 406 may be a Web server accessible via the Internet or an intranet, or other data storage device capable of serving data in response to requests. In particular embodiments, content server 406 is part of the same domain as system 96. Content server 406 may be one of a plurality of content servers owned, managed, or operated by an entity.

In the example of FIG. 4, the request from client device 404 may be received, or intercepted, by system 96. In another example, client device 404 may be configured to provide requests for content to system 96.

In one or more embodiments, system 96 is implemented in a computing system as described in connection with FIGS. 1, 2, and/or 3. In the example of FIG. 4, system 96 includes a proxy agent 410 (e.g., program code) that, when executed, causes system 96 to perform the operations described herein. System 96 further may include a data repository 412. Data repository 412 may be a data storage device such as a memory, a data processing system or node, a network accessible data storage device, or the like. In the example of FIG. 4, system 96 is capable of operating as a proxy server. System 96 may be implemented as an intermediary server capable of receiving requests from client device 404. System 96 is capable of facilitating faster delivery of responses to client device 404 by maintaining or keeping a cache of licenses for servers stored in data repository 412 and skipping validation checks with HTML licensing server 402 if not necessary.

In the example of FIG. 4, client device 404 is capable of constructing a request for content (e.g., a HyperText Transfer Protocol or "HTTP" request) and transmitting the request to an endpoint uniform resource locator (URL) corresponding to system 96. As an illustrative and nonlimiting example, a browser executed by client device 404 may submit a request for a Web page from content server 406. In another example, client device 404 may execute a script (e.g., a JavaScript) that requests a Web service from content server 406. In another example, client device 404 may execute an application that requests authentication verification from content server 406. The example requests from client device 404 may be directed to system 96.

System 96 is capable of receiving or intercepting the request from client device 404. System 96 is capable of deconstructing the request. System 96 further is capable of checking a local cache within data repository 412 that stores information gathered from previous interactions with content server 406 (and/or other content servers). In response to determining that the cache holds the content requested by client device 404, proxy agent 410 is capable of acting as a proxy server and responding back to client device 404 with the requested content. Content stored in the cache, for example, is presumed to be validated. System 96 may be configured to store any previously retrieved content that was successfully validated in the cache. In response to determining that the cache does not contain the content requested by client device 404, proxy agent 410 is capable of behaving as a client device and/or acting on behalf of client device 404 by forwarding the request for content to content server 406. Content server 406 processes the request and provides a response back to proxy agent 410.

System 96 receives the response, e.g., the requested content, from content server 406. In response to receiving the response from content server 406, system 96 is capable of deconstructing the response. System 96, for example, is capable of validating the HTML code received in the response. Data repository 412 may also store HTML license information obtained by system 96 from HTML licensing server 402 from prior interactions. System 96 is capable of validating the received HTML code against the HTML license information stored in data repository 412. Data repository 412 may be a local data storage device such that any data stored therein is local to proxy agent 410 and/or system 96.

In response to finding an entry or entries in the HTML license information in data repository 412 corresponding to the HTML code, system 96 is capable of determining whether one or more HTML constructs of the HTML code are valid, e.g., have not expired. In response to determining that the HTML constructs of the HTML code are valid, system 96 is capable of sending the HTML code to client device 404. In response to determining that the HTML license information in data repository 412 does not include any information corresponding to the HTML code, system 96 is capable of querying HTML licensing server 402 for HTML license information.

HTML licensing server 402 may be implemented as one or more interconnected data processing systems. HTML licensing server 402 is capable of responding to requests for HTML license information from system 96, e.g., proxy agent 410. HTML verification sever 402, for example, is capable of providing HTML license information to system 96 so that system 96 may verify whether HTML constructs in the HTML code obtained from content server 406 are valid.

As defined herein, an "HTML construct" means a unit or portion of HTML code. An example of an HTML construct is an HTML tag and the corresponding value. Another example of an HTML construct is an HTML structure that may be used to specify instructions that are executable by the client device. An HTML construct, for example, may be used to specify instructions that cause client device 404 to download or retrieve other content, resources, and/or code. Examples of code that may be downloaded by client device 404 include, but are not limited to, JavaScript (and/or other scripts) and Cascading Style Sheets (CSS).

System 96 is capable of using the received HTML license information to validate the HTML code received from content server 406. Further, system 96 is capable of updating the HTML license information stored in data repository 412 with the newly received HTML license information from HTML licensing server 402.

In one or more embodiments, proxy agent 410 is capable of modifying the HTML code that is received from content server 406 prior to forwarding the HTML code to client device 404. For example, proxy agent 410 may remove those HTML constructs that are determined to be invalid based on the comparison of the HTML code with the HTML license information, whether the HTML license information was initially stored in data repository 412 or newly obtained from HTML licensing server 402.

In cases where the HTML code is delivered to client device 404, e.g., where system 96 determines the HTML code to be valid or modifies the HTML code a way that makes the resulting modified HTML code valid by removing invalid HTML constructs, system 96 is capable of storing a copy of the HTML code, as delivered to client device 404 in the cache within data repository 412.

Figure 5:
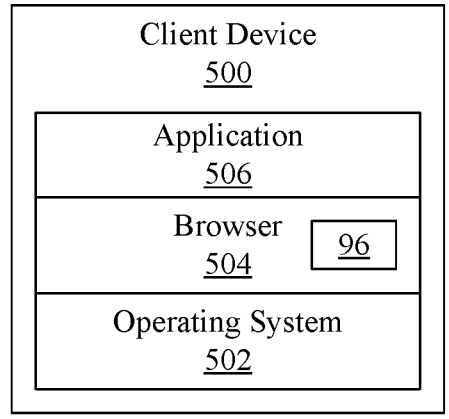
FIG. 5 depicts an implementation of a client device capable of validating HTML code according to an embodiment of the present invention.

FIG. 5 depicts an implementation of a client device 500 capable of validating HTML code according to an embodiment of the present invention. In the example of FIG. 5, client device 500 includes an operating system 502, optionally a browser 504, and optionally one or more other applications depicted as application 506. In the example of FIG. 5, system 96 is implemented within client device 500. For example, system 96 may be implemented as executable program code within client device 500 that is capable of executing in combination or in coordination with browser 504 and/or other applications contained therein.

In one or more embodiments, system 96 is implemented as an extension to browser 504. In one or more other embodiments, system 96 is implemented as another application such as application 506 and is capable of executing in a coordinated manner with browser 504 and/or with another application that is capable of requesting content as described herein. In any case, system 96 is capable of analyzing requests for content originating in client device 500, analyzing content received from one or more content servers, querying the HTML licensing server, and taking action as described herein based on the HTML license information data received as a response from the HTML licensing server. In the example of FIG. 5, system 96 is capable of notifying the requesting application that the HTML code is invalid and/or modifying received HTML code determined to be invalid prior to rendering such HTML code in client device 500 to a user.

Figure 6:
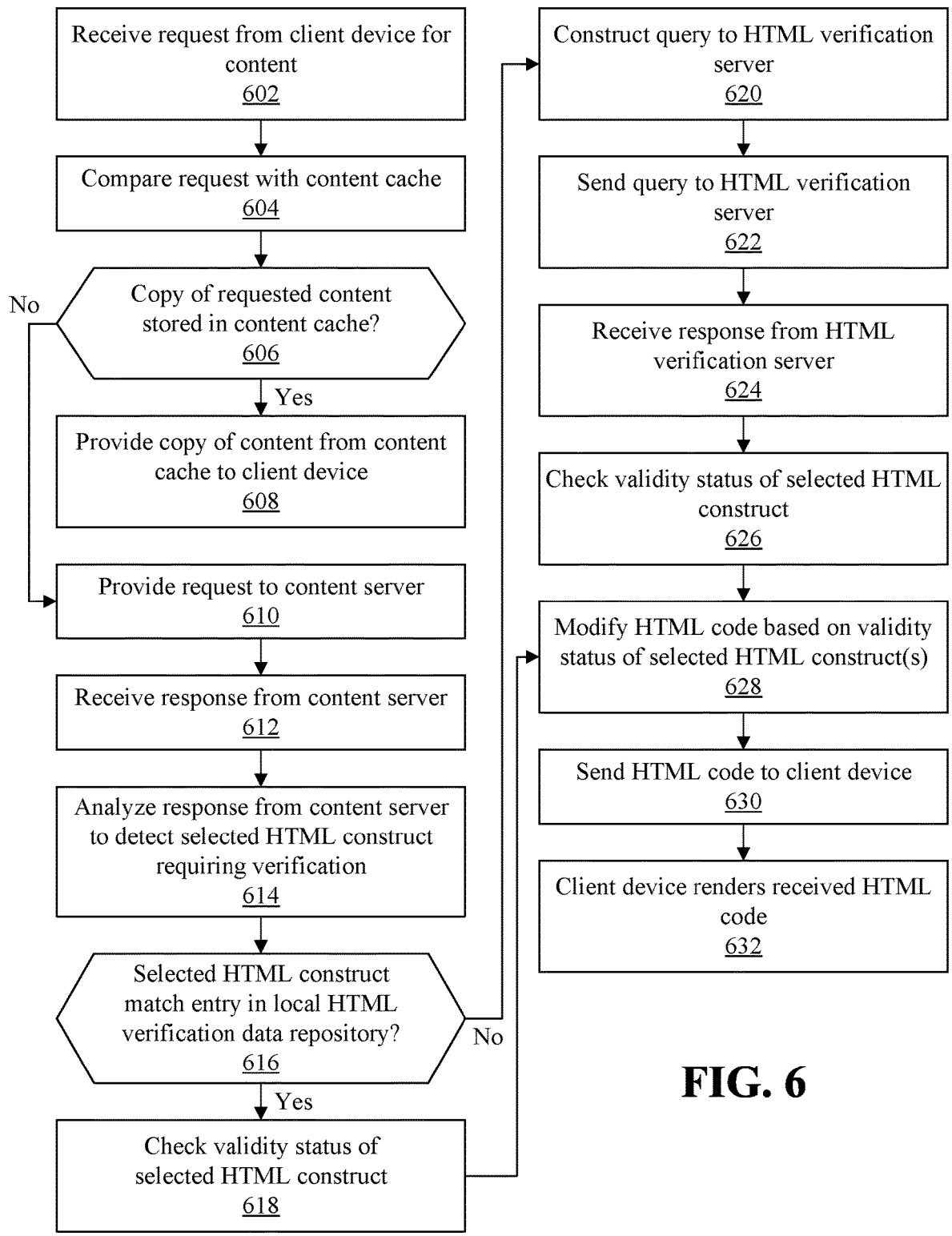
FIG. 6 illustrates a method of validating HTML code for a client device according to an embodiment of the present invention.

FIG. 6 illustrates a method 600 of validating HTML code for a client device according to an embodiment of the present invention. Method 600 may be performed by a system as described within this disclosure in connection with FIGS. 1-5.

In block 602, the system is capable of receiving a request from a client device for content. The client device, for example, constructs an HTTP request and transmits the HTTP request to an endpoint URL. The system is capable of receiving, or intercepting, the HTTP request from the client device. Listing 1 below illustrates an example of a request that may be received by the system from a client device.

Listing 1

GET / HTTP/1.1
Host: <<URL>>
User-Agent: curl/7.51.0
Accept: */*

In block 604, in response to receiving the request from the client device, the system is capable of comparing the request with a content cache. The content cache may be stored locally within the system. The content cache includes copies of content previously requested by the client device or other client devices and delivered to such client devices. As such, the copies of the content stored in the content cache have been deemed valid or been modified to be valid.

In block 606, the system is capable of determining whether a copy of the requested content is stored within the content cache. In response to determining that a copy of the requested content is stored within the content cache, method 600 continues to block 608. In block 608, the system is capable of providing a copy of the requested content, retrieved from the content cache, to the client device. In response to determining that a copy of the requested content is not stored within the content cache, method 600 continues to block 610.

In block 610, the system is capable of behaving as a client device by submitting a request for content to the content server. For example, the system is capable of generating a request for the content requested by the client device and submitting the request to the content server specified by the URL contained in the request from the client device. In the example of Listing 1, the system forwards the request to the URL noted therein. In another example, the system may forward the originally received request to the content server.

In block 612, the system receives a response from the content server. The response from the content server may include HTML code provided responsive to the request. The HTML code may be sent from the content server to the system as a response to a GET or a POST request. An example response from the content server is illustrated below in Listing 2.

Listing 2

```
HTTP/1.1 200 OK
content-length: 907
content-type: text/html
p3p: CP="NON CUR OTPi OUR NOR UNI"
server: WebSEAL/9.0.2.0
x-content-type-options: nosniff
cache-control: no-cache
x-xss-protection: 1; mode=block
content-security-policy: upgrade-insecure-requests;default-src 'self' data: <<URLs Listed Here>>
referrer-policy: strict-origin-when-cross-origin
strict-transport-security: max-age=31536000; include SubDomains
pragma: no-cache
set-cookie: MYL-S-SESSION-ID=0__/U2D1izlziiBfGg2/+5lK4S2qPYHTA5PzG0hEx/OYo0rwCadM3c=; Path=/; Secure; HttpOnly
set-cookie: NSC_JTBNQspyz-WT=ffffffff09ac4c7a45525d5f4f58455e445a4a42378b;path=/;secure;httponly
x-transport-license:
authority=URL/check_license.jsp;
licenseID=bfd9b4f683b1b959577352bbdd93c53b8d1585342e6762cabcb2988404cd41cf;
```

In the line "content-security-policy: upgrade-insecure-requests; default-src 'self' data: <<URLs Listed Here>>", the <<URLs Listed Here>> is used as a stand-in representing a listing of URLs that are actually included in the response. The listing specifies URLs from which additional content may be obtained for the HTML document when rendered in the client device. For purposes of illustration, such URLs are not actually listed to prevent live program code from being included in the present disclosure.

In the example of Listing 2, license information may be specified using a variety of different techniques. In one example, which is used in the example of Listing 2, license information may be specified using the DomainKeys Identified Mail (DKIM) protocol whereby a list of tag=value tuples are added to the HTTP server's response headers in an "X-Transport-License" header. Listing 3 lists the extracted license information from Listing 2 using this technique.

Listing 3

```
X-Transport-License:
authority=URL/check_license.jsp;
licenseID=bfd9b4f683b1b959577352bbdd93c53b8d1585342e6762cabcb2988404cd41cf;
```

In another example, the verification information may be specified using HTML whereby a list of tags with key=value attribute tuples are added to the <head> section of the HTML code as an <x-transport-license> tag with authority and licenseID attributes. This technique is illustrated below in Listing 4.

Listing 4

```
<head>
<x-transport-license authority="URL/check_license.jsp"
```

| Listing 4 |
|---|
| licenseID="bfd9b4f683b1b959577352bbdd93c53b8d1585342e6762cabcb2988404cd41cf" /><br></head> |

In the examples of Listings 3 and 4, the full URLs ending in "/check_license.jsp" are not illustrated. Appreciably, the URL may specify the HTML licensing server where the "check_license.jsp" is stored and available for execution.

In block 614, the system is capable of analyzing the response from the content server to detect selected HTML constructs therein requiring validation. In one or more embodiments, the system is capable of generating a document object model (DOM) of the HTML code. The system is capable of running one or more regular expressions based on locally stored rules against the DOM and/or the original HTML code to detect specified patterns, e.g., one or more selected HTML constructs. As an illustrative and nonlimiting example, the regular expressions may be constructed to identify HTML constructs that are often used to convey personal information such as electronic mail (email) addresses, names, images, and the like.

For purposes of illustration, method 600 is described in the context where the system detects a single HTML construct in block 614 as the selected HTML construct. It should be appreciated, however, that the system may detect more than one HTML construct as the selected constructs in block 614. In that case, the system is capable of analyzing and/or processing each of the selected HTML constructs, as determined in block 614, independently or in combination using the techniques and operations described herein.

In block 616, the system is capable of determining whether the selected HTML construct detected within block 614 matches an entry in locally stored HTML license information. The local HTML license information includes entries, where each entry may correspond to or specify a license. The local HTML license information includes entries from prior interactions with the HTML licensing server. In one or more embodiments, each entry in the local HTML license information specifies an HTML construct such as an HTML tag, a validity status such as valid or invalid, and a period of time for which the validity status is active. A validity status is active when a current time is within the period of time specified for the validity status.

In response to determining that the selected HTML constructs detected in block 614 matches an entry in the local HTML license information, method 600 continues to block 618. In response to determining that the selected HTML construct detected in block 614 does not match any entries in the local HTML license information, method 600 continues to block 628.

In block 618, the system is capable of checking the validity status of the selected HTML construct. For example, the system determines whether the validity status in the matched entry indicates valid or invalid. Further, the system is capable of determining whether the validity status is active by determining whether the current time is within the period of time specified in the matched entry. After block 618, the method may continue to block 628.

Continuing with block 620, in the case where the selected HTML construct did not match any entries in the local HTML license information, the system constructs a query to the HTML licensing server. The query requests validation for the selected HTML construct. For example, the system is capable of constructing a query that requests validation for each HTML construct detected in block 614 and for which corresponding entries were not found in the local HTML license information.

In one or more embodiments, the system constructs the query using the Online Certificate Status Protocol (OCSP) protocol. For example, the query requests validation of the selected HTML construct, e.g., an HTML tag. Listing 5 below illustrates an example of an HTTP GET transaction constructed using the OCSP protocol that may be generated by the system and sent to the HTML licensing server.

| Listing 5 |
|---|
| URL/check_license.jsp?licenseID=bfd9b4f683b1b959577352bbdd93c53b8d1585342e67<br>62cabcb2988404cd41cf+taglist=,head/meta[@owner="john@us.ibm.com"] |

Again, in the example of Listing 5, the URL of the HTML licensing server would be inserted in place of "URL" preceding "/check license.jsp". In one or more other embodiments, the system constructs the query using the HTTP POST method. In that case, the system uses the HTTP POST method with URL/check_license.jsp with a payload as shown in Listing 6 and submits the request to the HTML licensing server.

| Listing 6 |
|---|
| licenseID=bfd9b4f683b1b959577352bbdd93c53b8d1585342e6762cabcb2988404cd41cf;<br>taglist=img,head/meta[@owner="user_email_address"]; |

In the example of Listing 6, "user_email_address" would specify an actual email address of a particular user. In any case, in the examples of Listings 5 and 6, the request specifies the image tag (<img>) and an email address that were identified in block 614 during pattern matching. In this example, the system determines whether the image tag and the email address specified in the HTML code are permissible or valid.

In block 622, the system is capable of sending the query to the HTML licensing server. For example, the system sends the query to the HTML licensing server only in response to determining that the local data repository of HTML license information does not include a valid license corresponding to the HTML code. In block 624, the system is capable of receiving a response from the HTML licensing server. The HTML licensing server's response indicates a period of time for which the validity status is/are active or in force and a validity status for each HTML construct on the list. Listing 7 illustrates an example response from the HTML licensing server.

---
Listing 7
---
X-Transport-License: status={valid}; max-age=600; taglist=img;
X-Transport-License: status={invalid}; max-age=600; taglist=head/meta[@owner="user_email_address"];

---

The HTML licensing server is capable of storing HTML licensing information in any of a variety of different formats and/or using any of a variety of different data structures. In one example, the HTML licensing server is capable of storing HTML licensing information, e.g., licenses, as JSON objects. An illustrative and nonlimiting example of a license stored as a JSON object is illustrated in Listing 8. Within Listing 8, the license record includes the following tokens: an identifier (ID) which is unique to the license; "Allowed" followed by a comma-separated list of allowed (e.g., valid) tags; "Disallowed" followed by a comma-separated list of disallowed (e.g., invalid) tags; and "notBefore" and "notAfter" specifying timestamps that designate the period of time for which the license (e.g., and the validity status(es)) are active or in force.

---
Listing 8
---
{
"license}:{
   "ID":
"bfd9b4f683b1b959577352bbdd93c53b8d1585342e6762cabcb2988404cd41cf",
   "Allowed": "*",
   "Disallowed": "head/meta[@owner="user_email_address"]",
   "notBefore": "YYYY/MM/DD HH:MM:SS",
   "notAfter": "YYYY/MM/DD HH:MM:SS"
   }
}

---

In one or more other embodiments, the license record may include additional information beyond what is illustrated in the example of listing 8. Referring to the example of Listing 8, the HTML licensing server need only look up the received query by the ID and iterate over the provided tags. Upon matching the received query to the license record, for example, the HTML licensing server determines that the tag is allowed in the response.

In block 626, the system is capable of checking the validity status of the selected HTML construct based on the response from the HTML licensing server. The example response of Listing 7, for example, indicates that the image tag is valid and allowed whereas the head/meta [@owner="user_email_address"] is not valid.

In block 628, the system is capable of modifying the HTML code based on the validity status of the selected HTML construct. In the foregoing example, the system is capable of removing the HTML construct that is invalid. For example, the system is capable of removing the email address from the HTML code (e.g., the tag and corresponding value). As discussed, in cases where the system validates a plurality of different HTML constructs, the system is capable of removing from the HTML code any HTML construct that is determined to be invalid based on the HTML license information while allowing those HTML constructs determined to be valid to remain within the HTML code.

In block 630, the system is capable of sending the HTML code to the client device. In the case where the system has modified the HTML code, for example, the system sends the modified HTML code to the client device. In the case where the system has not modified the HTML code, the system is capable of sending the original HTML code to the client device (e.g., when validated).

In block 632, the client device is capable of rendering the received HTML code for display and/or presentation to a user.

In one or more other embodiments, the system is capable of informing the client device that the HTML code received from the content server is invalid. In such cases, for example, the system may not forward the HTML code in any form to the client device. Listing 9 illustrates an example response that the system may send to a client device indicating that the HTML code was invalid.

---
Listing 9
---
HTTP/1.1 200 OK
content-length: 907
content-type: text/html
p3p: CP="NON CUR OTPi OUR NOR UNI"
server: WebSEAL/9.0.2.0
x-content-type-options: nosniff
cache-control: no-cache
pragma: no-cache
x-transport-license: authority=URL/check_license.jsp;
licenseID=bfd9b4f683b1b959577352bbdd93c53b8d1585342e6762cabcb2988404cd41cf;

FIG. 7 illustrates a method 700 of validating HTML code for a client device according to another embodiment of the present invention. Method 700 may be performed by a system as described within this disclosure in connection with FIGS. 1-5.

In block 702, the system is capable of receiving HTML code from a content server. The HTML code may be sent in response to a request originating from a client device. In block 704, the system is capable of sending, to an HTML licensing server, a query specifying the content server and a list including an HTML construct detected in the HTML code. In block 706, the system is capable of receiving, from the HTML licensing server, HTML license information specifying a validity status for the HTML construct on the list and a period of time for which the validity status is active. In block 708, the system is capable of determining that the HTML code is not licensed based on a current time, the validity status of the HTML construct, and the period of time.

In one or more embodiments, method 700 continues to block 710. In block 710, the system is capable of notifying the client device that the HTML code is invalid. In one or more other embodiments, method 700 continues to block 712. In block 712, the system is capable of modifying the HTML code as described herein and providing the modified HTML code to the client device.

In one or more other embodiments, the system is capable of notifying the client that the HTML code is invalid. The system is further capable of querying the user whether the user would like to receive modified HTML code that is valid. In that case, in response to the user indicating a desire to receive modified HTML code, the system is capable of modifying the HTML code as described herein and providing the modify HTML code to the client device.

As discussed, in embodiments where the system is implemented within the client device, the system is capable of performing the operations described within this disclosure within the client device. The system is capable of preventing the client device from rendering the HTML code when determined invalid or allowing modified HTML code to be rendered by the client device.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method, comprising:
receiving, using computer hardware, HyperText Markup Language (HTML) code from a content server, wherein the HTML code is sent in response to a request originating from a client device, wherein the content server comprises a first data processing system and the client device comprises a second data processing system;

sending, to an HTML licensing server, using the computer hardware, a query specifying the content server and a list including an HTML construct detected in the HTML code;

receiving, from the HTML licensing server, using the computer hardware, HTML license information specifying a validity status for the HTML construct on the list and a period of time for which the validity status is active; and determining, using the computer hardware, that the HTML code is invalid based on a current time, the validity status of the HTML construct, and the period of time.

2. The method of claim 1, further comprising:

modifying the HTML code to generate modified HTML code by removing, from the HTML code, the HTML construct in response to determining that the HTML construct has an invalid validity status for the current time.

3. The method of claim 2, further comprising:

sending the modified HTML code to the client device.

4. The method of claim 1, further comprising:

notifying the client device that the HTML code is not licensed.

5. The method of claim 1, wherein the HTML construct includes a tag and a corresponding value for the tag.

6. The method of claim 1, further comprising:

sending the query to the HTML licensing server only in response to determining that a local data repository of HTML license information does not include a valid license corresponding to the HTML code.

7. The method of claim 6, further comprising:

updating the local data repository of HTML license information with the HTML license information received from the HTML licensing server.

8. The method of claim 1, wherein the computer hardware includes a proxy server configured to perform the receiving the HTML code, the sending the query, the receiving HTML license information, and the determining.

9. The method of claim 1, wherein the computer hardware includes the client device configured to perform the receiving the HTML code, the sending the query, the receiving HTML license information, and the determining.

10. The method of claim 1, further comprising:

detecting the HTML construct within the HTML code by matching a predetermined pattern corresponding to the HTML construct with the HTML code.

11. A system, comprising:

a processor configured to initiate executable operations including:

receiving, using computer hardware, HyperText Markup Language (HTML) code from a content server, wherein the HTML code is sent in response to a request originating from a client device, wherein the content server comprises a first data processing system and the client device comprises a second data processing system;

sending to an HTML licensing server, using the computer hardware, a query specifying the content server and a list including an HTML construct detected in the HTML code;

receiving from the HTML licensing server, using the computer hardware, HTML license information specifying a validity status for the HTML construct on the list and a period of time for which the validity status is active; and determining, using the computer hardware, that the HTML code is invalid based on a current time, the validity status of the HTML construct, and the period of time.

12. The system of claim 11, wherein the processor is configured to initiate executable operations further comprising:

modifying the HTML code to generate modified HTML code by removing, from the HTML code, the HTML construct in response to determining that the HTML construct has an invalid validity status for the current time.

13. The system of claim 12, wherein the processor is configured to initiate executable operations further comprising:

sending the modified HTML code to the client device.

14. The system of claim 11, wherein the processor is configured to initiate executable operations further comprising:

notifying the client device that the HTML code is not licensed.

15. The system of claim 11, wherein the HTML construct includes a tag and a corresponding value for the tag.

16. The system of claim 11, wherein the processor is configured to initiate executable operations further comprising:

sending the query to the HTML licensing server only in response to determining that a local data repository of HTML license information does not include a valid license corresponding to the HTML code.

17. The system of claim 16, wherein the processor is configured to initiate executable operations further comprising:

updating the local data repository of HTML license information with the HTML license information received from the HTML licensing server.

18. The system of claim 11, wherein the processor is implemented within a proxy server.

19. The system of claim 12, wherein the processor is implemented within the client device.

20. A computer program product comprising a computer readable storage medium having program instructions embodied therewith, the program instructions executable by a processor to cause the processor to initiate executable operations comprising:

receiving HyperText Markup Language (HTML) code from a content server, wherein the HTML code is sent in response to a request originating from a client device, wherein the content server comprises a first data processing system and the client device comprises a second data processing system;

sending, to an HTML licensing server, a query specifying the content server and a list including an HTML construct detected in the HTML code;

receiving, from the HTML licensing server, HTML license information specifying a validity status for the HTML construct on the list and a period of time for which the validity status is active; and determining that the HTML code is invalid based on a current time, the validity status of the HTML construct, and the period of time.

* * * * *